(12) United States Patent
Maki

(10) Patent No.: US 10,933,571 B2
(45) Date of Patent: Mar. 2, 2021

(54) INJECTION MOLDING MACHINE

(71) Applicant: FANUC CORPORATION, Yamanashi (JP)

(72) Inventor: Ikuhiro Maki, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/504,408

(22) Filed: Jul. 8, 2019

(65) Prior Publication Data
US 2020/0016813 A1 Jan. 16, 2020

(30) Foreign Application Priority Data

Jul. 11, 2018 (JP) .............................. JP2018-131545

(51) Int. Cl.
B29C 45/84 (2006.01)
B29C 45/17 (2006.01)
B29C 48/96 (2019.01)
B29C 65/00 (2006.01)
B29C 37/00 (2006.01)

(52) U.S. Cl.
CPC ............ *B29C 45/84* (2013.01); *B29C 48/965* (2019.02); *B29C 66/87445* (2013.01); *B29C 2037/94* (2013.01); *B29C 2045/1797* (2013.01)

(58) Field of Classification Search
CPC ................ B29C 45/84; B29C 2037/94; B29C 2045/1797; B29C 45/1701; B29C 48/96; B29C 48/965; B29C 66/87445; B29C 2045/846; B29C 45/34
See application file for complete search history.

(56) References Cited

U.S. PATENT DOCUMENTS

| 3,359,598 A | * | 12/1967 | Bucy | .................. B29C 45/84 425/153 |
| 3,771,936 A | * | 11/1973 | Moslo | ................... F16P 3/12 425/153 |
| 3,902,582 A | * | 9/1975 | Cross | ................... B29C 45/84 192/135 |

(Continued)

FOREIGN PATENT DOCUMENTS

| CN | 1403676 A | 3/2003 |
| CN | 201346840 Y | 11/2009 |

(Continued)

OTHER PUBLICATIONS

English Machine Translation for Japanese Publication No. 06297534 A, published Oct. 25, 1994, 5 pgs.

(Continued)

*Primary Examiner* — Xiao S Zhao
*Assistant Examiner* — Emmanuel S Luk
(74) *Attorney, Agent, or Firm* — Fredrikson & Byron, P.A.

(57) ABSTRACT

An injection molding machine includes a safety door and a guide for slidably guiding the safety door in a direction of opening and closing a mold of the injection molding machine. The guide includes: a first guide part fixed to a machine base of the injection molding machine; a second guide part arranged on the safety door's closing direction side of the first guide part and configured to be removable from the machine base; and a coupling configured to connect the first guide part and the second guide part so that the second guide part can be moved onto the first guide part.

6 Claims, 12 Drawing Sheets

(56) References Cited

U.S. PATENT DOCUMENTS

| | | | | |
|---|---|---|---|---|
| 4,382,763 | A | * | 5/1983 | Hehl ................ B29C 45/84 |
| | | | | 425/153 |
| 4,578,026 | A | * | 3/1986 | Hehl ................ B29C 45/84 |
| | | | | 425/151 |
| 5,310,327 | A | * | 5/1994 | Phillips ............ B29C 45/1771 |
| | | | | 264/334 |
| 5,834,036 | A | * | 11/1998 | Ueno ................ B29C 45/84 |
| | | | | 425/151 |
| 10,099,415 | B2 | * | 10/2018 | Tanaka ............... B29C 45/77 |
| 2008/0263961 | A1 | * | 10/2008 | Nishimura ........... B22D 17/20 |
| | | | | 49/449 |
| 2016/0114512 | A1 | * | 4/2016 | Seki ................ B29C 45/84 |
| | | | | 425/151 |
| 2017/0334116 | A1 | * | 11/2017 | Iwakura ............. B29C 45/76 |
| 2019/0001542 | A1 | * | 1/2019 | Tanemura ............ B29C 45/64 |

FOREIGN PATENT DOCUMENTS

| | | | |
|---|---|---|---|
| CN | 201895401 | U | 7/2011 |
| CN | 103419345 | A | 12/2013 |
| CN | 206874184 | U | 1/2018 |
| CN | 207381739 | U | 5/2018 |
| JP | 6297534 | A | 10/1994 |
| JP | 2003276071 | A | 9/2003 |
| JP | 2013237175 | A * | 11/2013 ............ B29C 45/84 |
| WO | 2015150991 | A1 | 10/2015 |

OTHER PUBLICATIONS

English Abstract and Machine Translation for Japanese Publication No. JP2003-276071A, published Sep. 30, 2003, 14 pgs.

English Abstract and Machine Translation for Chinese Publication No. CN1403676A, published Mar. 19, 2003, 4 pgs.

English Abstract and Machine Translation for Chinese Publication No. CN201346840Y, published Nov. 18, 2009, 3 pgs.

English Abstract and Machine Translation for Chinese Publication No. CN201895401U, published Jul. 13, 2011, 5 pgs.

English Abstract and Machine Translation for Chinese Publication No. CN103419345A, published Dec. 4, 2013, 8 pgs.

English Abstract and Machine Translation for Chinese Publication No. CN206874184U, published Jan. 12, 2018, 8 pgs.

English Abstract and Machine Translation for Chinese Publication No. CN207381739U, published May 18, 2018, 4 pgs.

\* cited by examiner

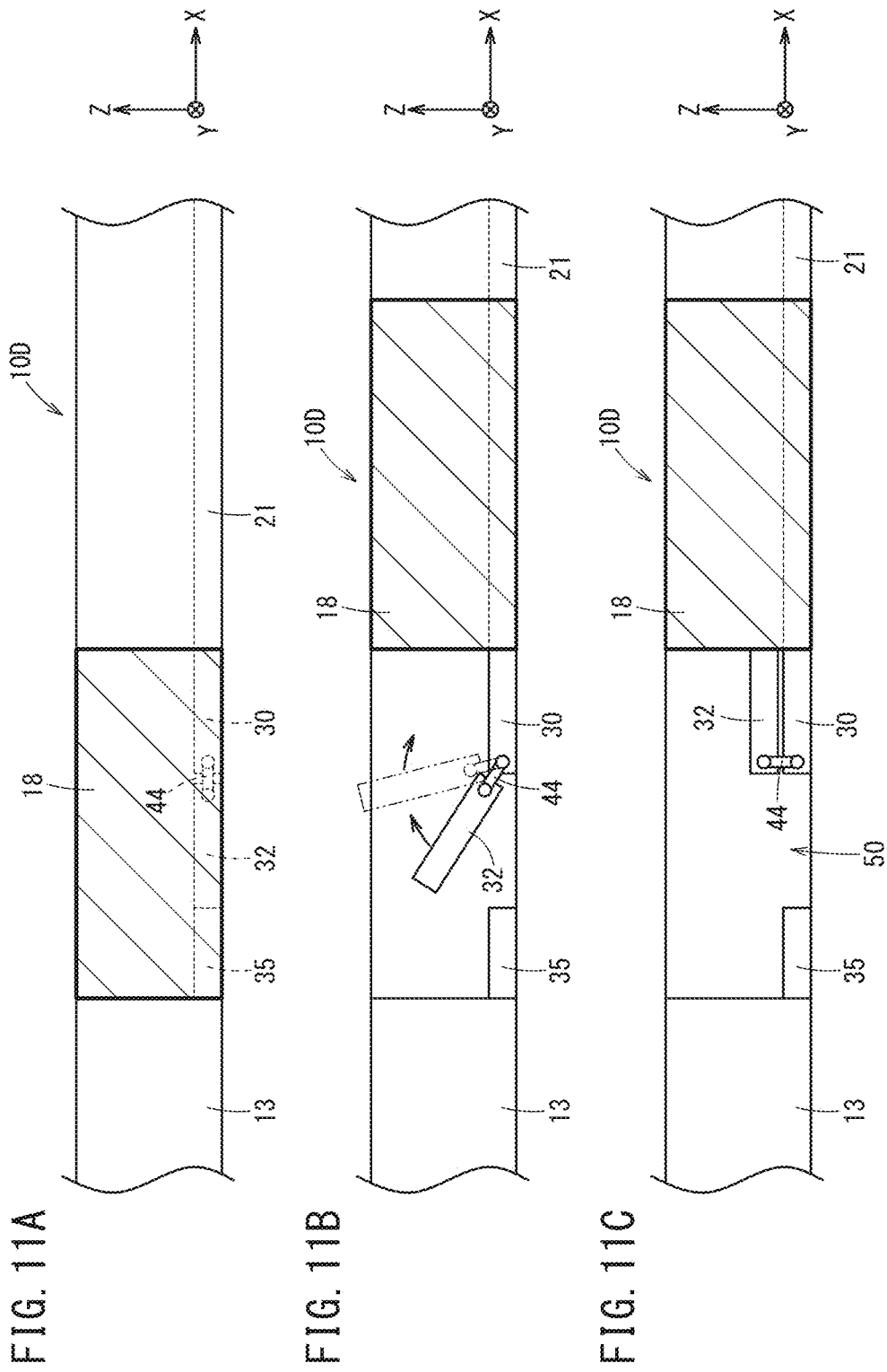

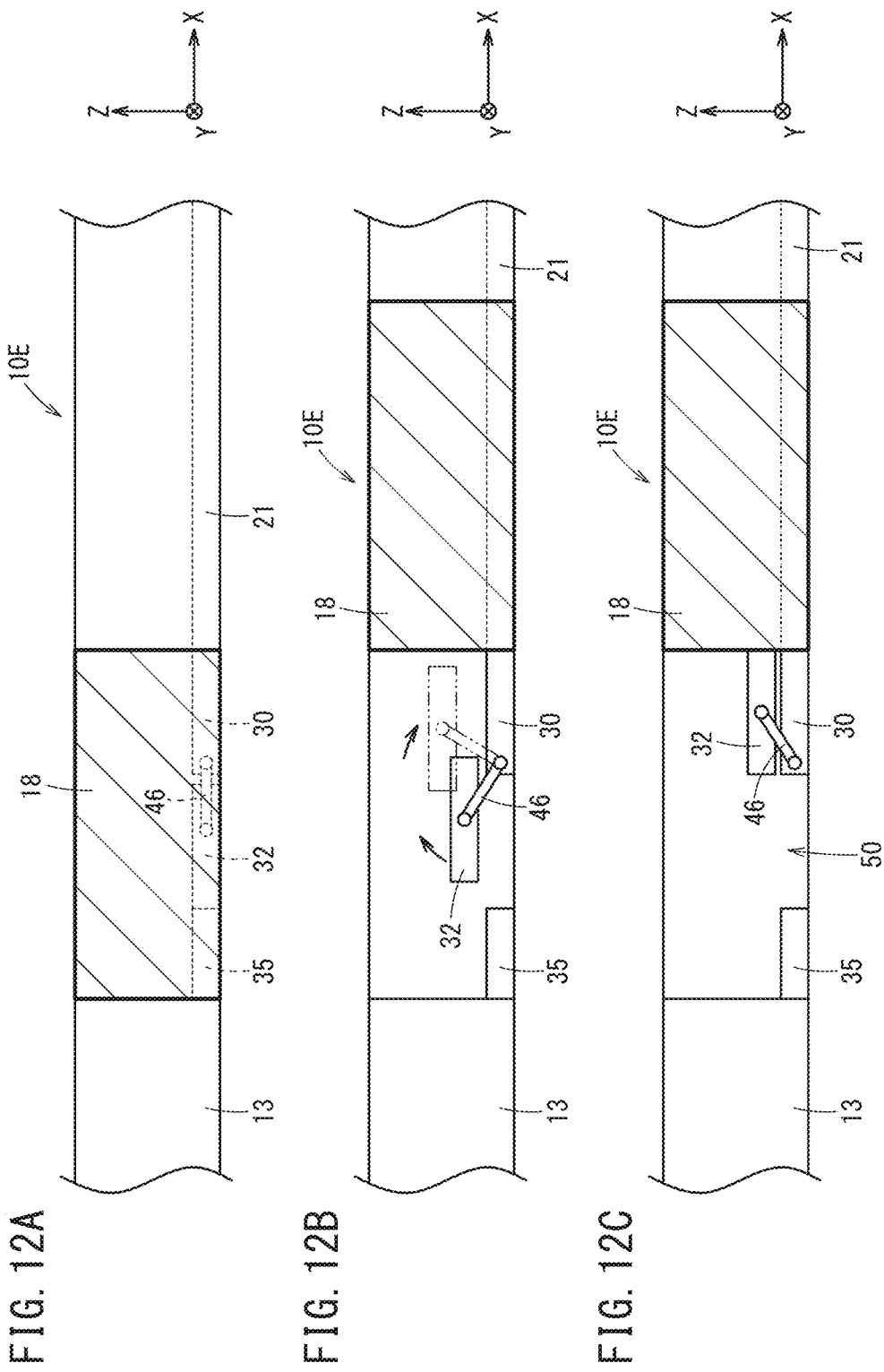

INJECTION MOLDING MACHINE

CROSS-REFERENCE TO RELATED APPLICATION

This application is based upon and claims the benefit of priority from Japanese Patent Application No. 2018-131545 filed on Jul. 11, 2018, the contents of which are incorporated herein by reference.

BACKGROUND OF THE INVENTION

Field of the Invention

The present invention relates to an injection molding machine having a safety door.

Description of the Related Art

Japanese Laid-Open Patent Publication No. 06-297534 discloses a rear safety door device of an injection molding machine provided with a guide for slidably guiding the safety door in the direction along which the mold is opened and closed in the injection molding machine.

SUMMARY OF THE INVENTION

However, with the rear safety door device disclosed in Japanese Laid-Open Patent Publication No. 06-297534, when the operator opens the safety door to work a device inside the injection molding machine, the guide hinders the operator's work so that there is a problem that the workability cannot be improved.

The aspect of the present invention resides in an injection molding machine comprising a safety door and a guide configured to slidably guide the safety door in a direction of opening and closing a mold of the injection molding machine, wherein the guide includes: a first guide part fixed to a machine base of the injection molding machine; a second guide part arranged on the safety door's closing direction side of the first guide part and configured to be removable from the machine base; and a coupling configured to connect the first guide part and the second guide part so that the second guide part can be moved to a position over the first guide part.

According to the present invention, when the operator opens the safety door to work the device inside the injection molding machine, the guide will not get in the way, so that the workability can be improved.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11A is a view schematically showing a state in which a safety door of an injection molding machine according to a $1^{st}$ example of a variation 3 is closed; FIG. 11B is a view schematically showing that a second guide part is being moved to a position over a first guide part in a state where the safety door of the injection molding machine according to the $1^{st}$ example of the variation 3 is opened; FIG. 11C is a view schematically showing a state in which the safety door of the injection molding machine according to the $1^{st}$ example of the variation 3 is opened with the second guide part laid over the first guide part; and FIG. 12A is a view schematically showing a state in which a safety door of an injection molding machine according to a $2^{nd}$ example of the variation 3 is closed; FIG. 12B is a view schematically showing that a second guide part is being moved to a position over a first guide part in a state where the safety door of the injection molding machine according to the $2^{nd}$ example of the variation 3 is opened; FIG. 12C is a view schematically showing a state in which the safety door of the injection molding machine according to the $2^{nd}$ example of the variation 3 is opened with the second guide part laid over the first guide part.

DESCRIPTION OF THE PREFERRED EMBODIMENTS

An injection molding machine according to the present invention will be detailed below by describing a predetermined embodiment with reference to the accompanying drawings.

Embodiment

Figure 1:
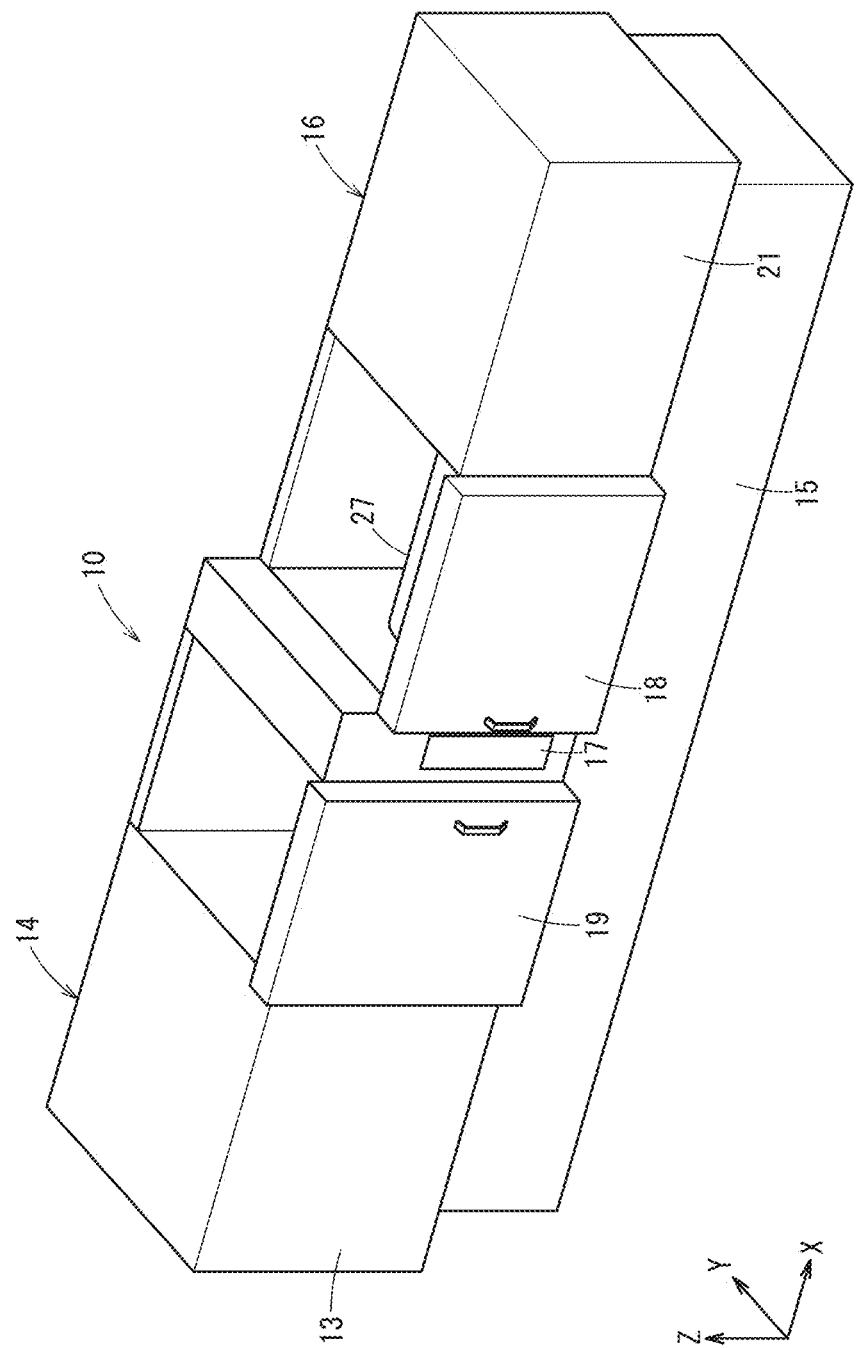
FIG. 1 is a perspective view showing a state of safety doors of an injection molding machine according to an embodiment of the present invention in which the safety doors are closed.
Figure 2:
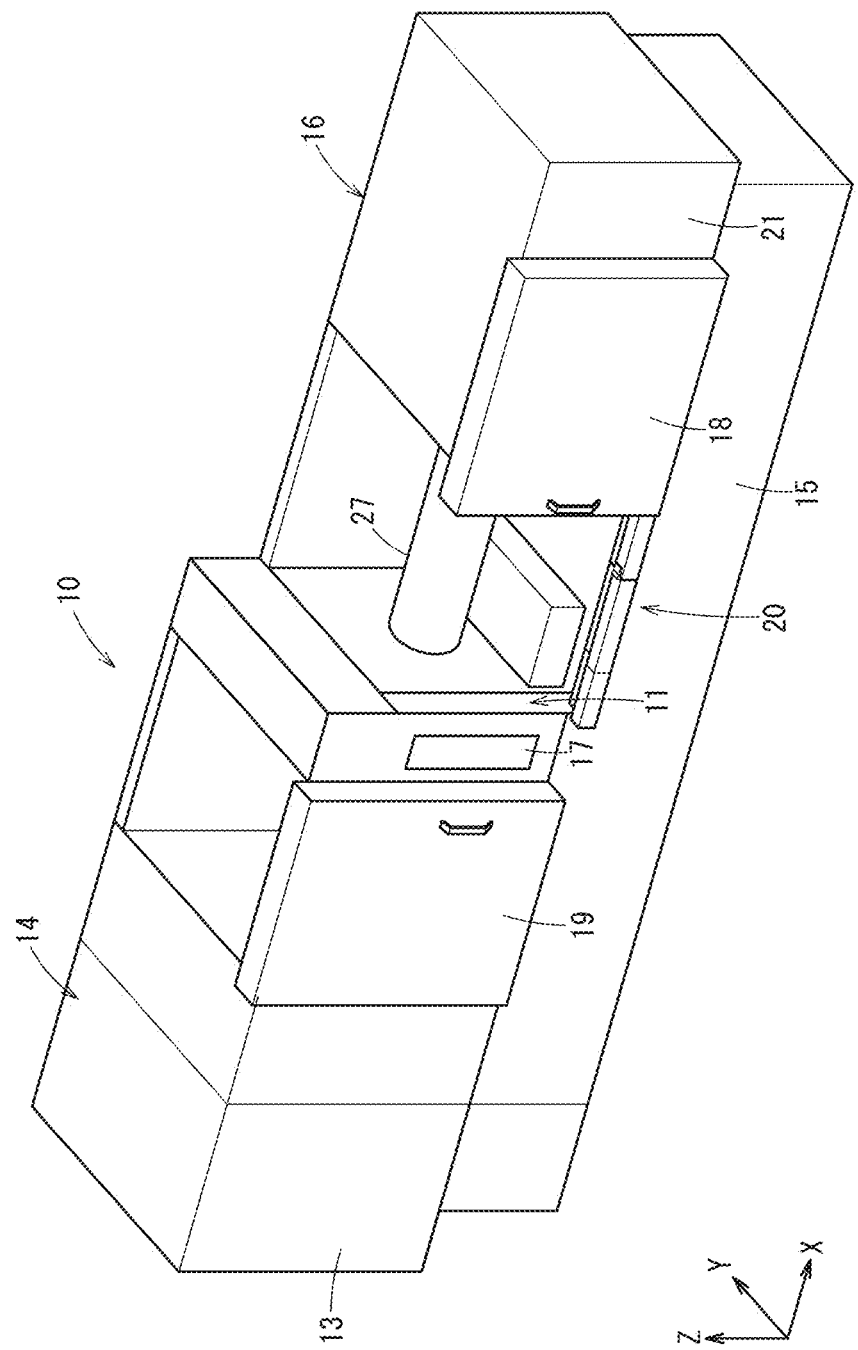
FIG. 2 is a perspective view showing a state of the injection molding machine according to the embodiment of the present invention, in which one of the safety doors is opened and the other is closed.

FIGS. 1 and 2 schematically show the overall configuration of an injection molding machine 10 that is an example of the injection molding machine of the present invention. The following description will be made using a XYZ three-dimensional orthogonal coordinate system shown in FIG. 1.

The injection molding machine 10 includes a clamping unit 14, an injection unit 16 and a machine base 15 as shown in FIGS. 1 and 2.

The clamping unit 14 is a device that opens and closes a mold during injection molding and generates a mold clamping force. The mold is opened and closed in the X-axis direction. The clamping unit 14 is arranged on a portion of the negative X side of the machine base 15. The machine base 15 is provided with a first guard 13 which surrounds the clamping unit 14. An unillustrated opening is formed in a portion on the positive X side of the negative Y-side wall of the first guard 13. This opening exposes the mold in the clamping unit 14. A safety door 19 capable of opening and closing the opening is provided for the machine base 15.

The injection unit 16 is a device for injecting a resin through a built-in cylinder 27 in injection molding. The injection unit 16 is arranged on a portion of the positive X side of the machine base 15. The machine base 15 is provided with a second guard 21 that surrounds the injection unit 16. An opening 11 is formed in a portion on the negative X side of the negative Y-side wall of the second guard 21. A safety door 18 capable of opening and closing the opening 11 is provided for the machine base 15. FIG. 1 shows the safety door 18 of the injection molding machine 10 closed. FIG. 2 shows the safety door 18 of the injection molding machine 10 open.

The resin material ejected from the injection unit 16 is injected into the cavity of the mold. A resin molded article is formed by filling the cavity with the resin material.

At this stage, the operator operates an operation panel 17 arranged between the safety door 18 and the safety door 19 that are closed (in a state where the corresponding openings are closed by the respective safety doors), so as to actuate the injection molding machine 10 to mold a resin molded product. Thus, the safety of the operator or the like who works around the injection molding machine 10 can be secured at the time of operating the injection molding machine 10.

On the other hand, when the injection molding machine 10 is not in operation, the operator opens the safety door 18 and the safety door 19 as appropriate and performs maintenance, inspection, and other operations on the injection unit 16 and the clamping unit 14.

Figure 3:
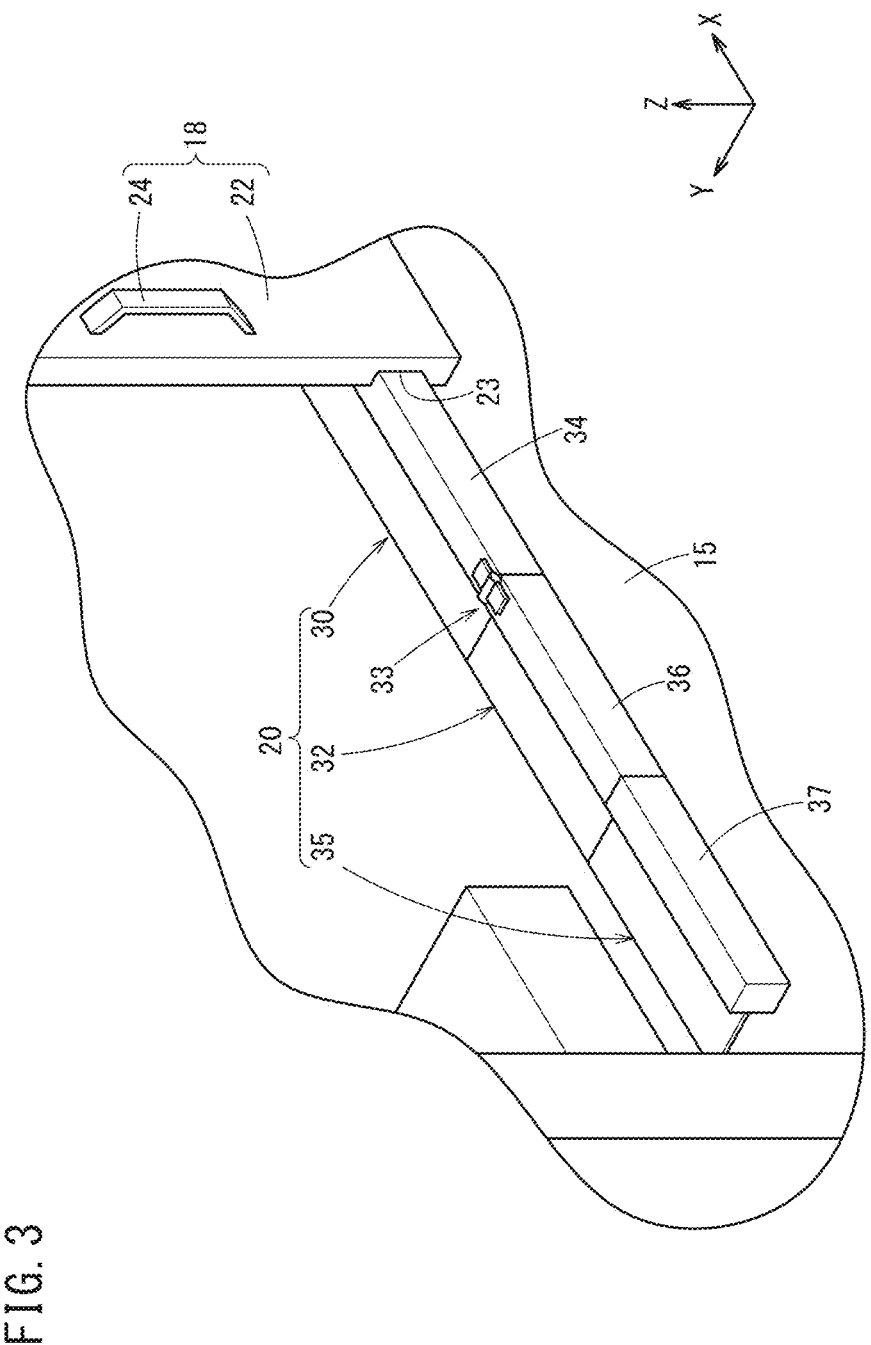
FIG. 3 is a view showing a state in which the safety door of the injection molding machine according to the embodiment of the present invention is open with a second guide part set in place for guiding the door.

As shown in FIG. 3, the safety door 18 is guided so as to be movable (slidable) in a mold opening/closing direction (X-axis direction) by a guide 20 provided on the machine base 15.

The safety door 18 includes a door member 22 and a handle 24. A groove 23 extending in the X-axis direction is formed, along substantially the entire edge in the X-axis direction in a lower end portion of the inner face (on the positive Y side) of the door member 22.

The guide 20 is provided so as to project to the negative Y side from the machine base 15. The guide 20 includes a first guide part 30, a second guide part 32 provided on the closing direction (negative X-direction) side of the safety door 18 with respect to the first guide part 30, and a third guide part 35 provided on the closing direction (negative X-direction) side of the safety door 18 with respect to the second guide part 32.

The first guide part 30 and the third guide part 35 are fixed to the machine base 15. The second guide part 32 is provided to be removable (separable) from the machine base 15. The second guide part 32 is connected with the first guide part 30 by a hinge (coupling) 33 so as to be movable to the upper (positive Z-direction) side of the first guide part 30 from the guiding position for guiding the movement of the safety door 18 (see FIG. 4). As can be seen from FIG. 4, in order to permit the second guide part 32 to rotate relative to the first guide part 30, it is necessary to displace the safety door 18 to some extent toward the opening direction (positive X-direction) side.

Figure 4:
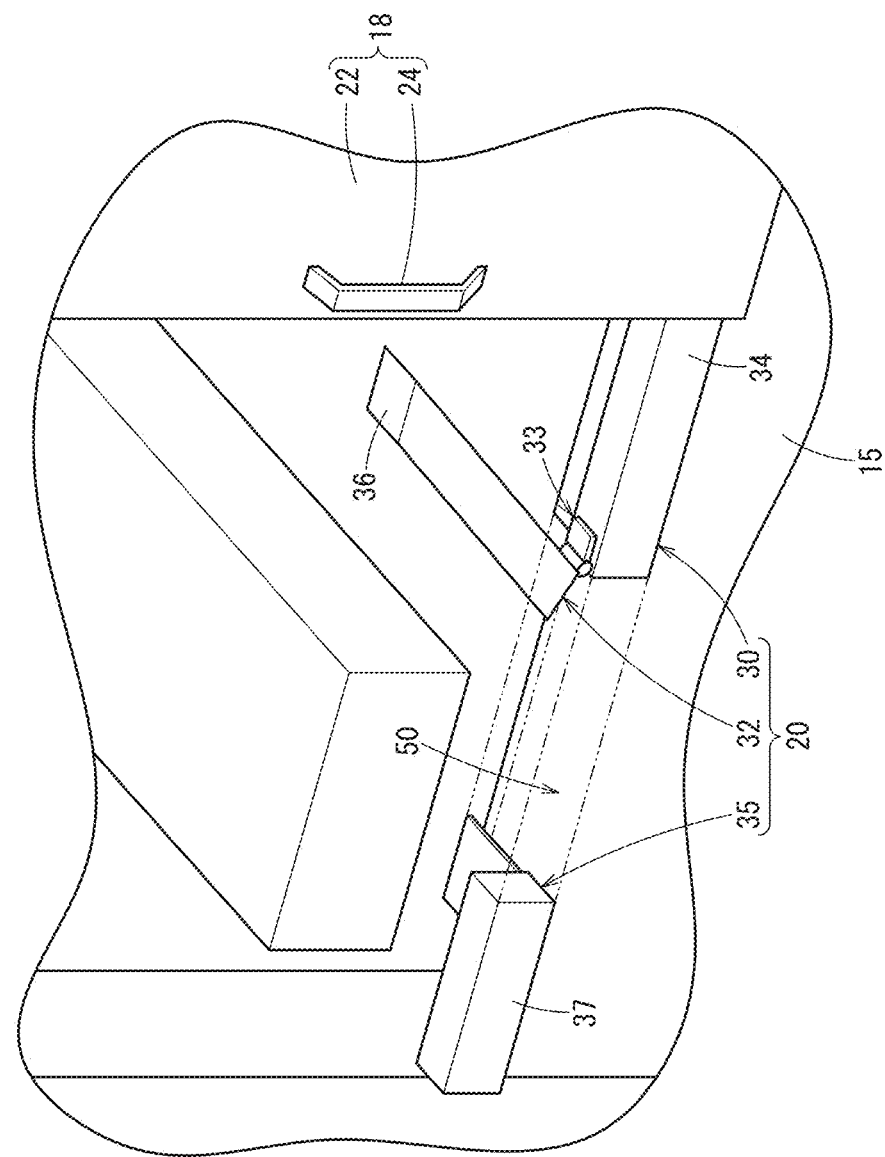
FIG. 4 is a view showing a state in which the safety door of the injection molding machine according to the embodiment of the present invention is open with the second guide part positioned over a first guide part.
Figure 5:
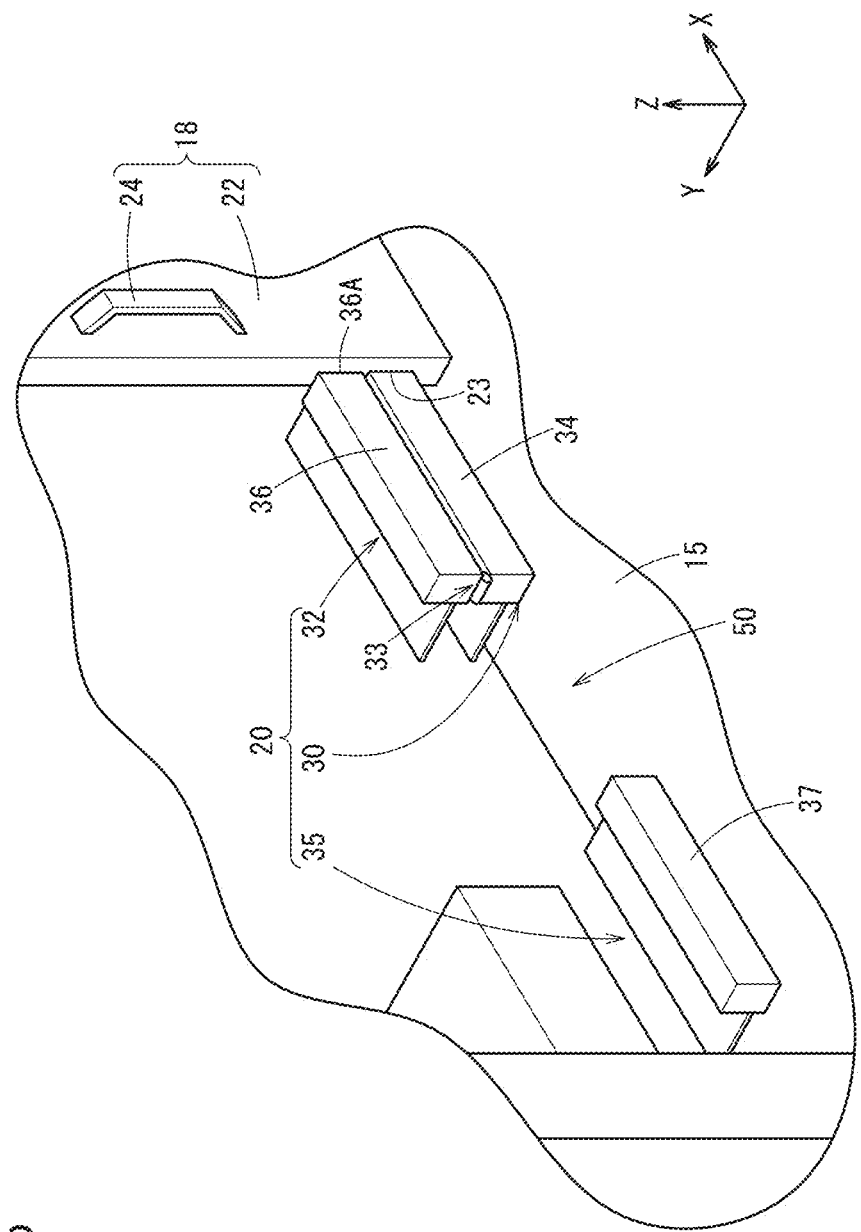
FIG. 5 is a view showing a state in which the safety door of the injection molding machine according to the embodiment of the present invention is open with the second guide part folded up on the first guide part.

The first guide part 30 includes a first rail 34 fitted in the groove 23 of the safety door 18 as shown in FIGS. 3 to 5. The safety door 18 is slidable in the X-axis direction along the first rail 34.

The second guide part 32 includes a second rail 36 fitted in the groove 23 of the safety door 18 when located in the guiding position, as shown in FIG. 3. The safety door 18 is slidable in the X-axis direction along the second rail 36 when the second guide part 32 is located in the guiding position.

The third guide part 35 includes a third rail 37 fitted in the groove 23 of the safety door 18 as shown in FIGS. 3 to 5. The safety door 18 can slide in the X-axis direction along the third rail 37.

When the second guide part 32 is located in the guiding position, the first rail 34, the second rail 36 and the third rail 37 substantially form a single guide rail slidably guiding the safety door 18 (see FIG. 3).

In order to operate the above-described injection unit 16, the operator manually opens the safety door 18 (see FIG. 2). Then, the operator rotates the second guide part 32 located at the guiding position (see FIG. 3), relative to the first guide part 30 (see FIG. 4), and folds up the second guide part 32 with respect to the first guide part 30 (to lay the second guide part 32 over the first guide part 30, see FIG. 5). As a result, an opening 50 corresponding to the length of the second guide part 32 is created in the guide 20, so that the operator can easily access the injection unit 16 through the opening 50. That is, when the operator works the injection unit 16, the guide 20 will not get in the way, and the work performance can be improved. Further, the positive X-side end (more specifically, the positive X-side end, designated at 36A, of the second rail 36) of the second guide part 32 folded with respect to the first guide part 30 opposes the negative X-side end face of the safety door 18. At this time, even if an external force toward the closing direction (negative X-direction) side (for example, an external force when another operator attempts to close the safety door 18 by mistake) acts on the safety door 18, the end face on the negative X side of the safety door 18 hits the positive X-side end of the second guide part 32 (more specifically, the positive X-side end 36A of the second rail 36). The movement of the safety door 18 in the closing direction is thereby prevented. As a result, the safety door 18 is prevented from being closed while the operator is working and in addition, the safety door 18 is prevented from obstructing the operator's work.

That is, the second guide part 32 has a stopper that prevents movement of the safety door 18 in its closing direction when the safety door 18 is located on the opening side and when the second guide part 32 is moved to a predetermined position over the first guide part 30. At the predetermined position, the second guide part 32 is positioned to be laid over the first guide part 30, so that the stopper stops the movement of the safety door 18 in its closing direction (negative X-direction) when the second guide part 32 is located at the predetermined position. Additionally, the stopper herein is the end on the opening direction (positive X-direction) side of the second guide part 32 when the second guide part 32 is located at the predetermined position (more specifically, the end 36A on the positive X side of the second rail 36).

As described above, when the injection molding machine 10 is not in operation, the operator, as appropriate, opens the safety door 19 and performs maintenance, inspection, and other operations on the clamping unit 14. Therefore, a guide having the same configuration as the guide 20 may be provided which slidably guides the safety door 19 in the mold opening/closing direction (X-axis direction). As a result, when the operator performs an operation on the clamping unit 14, the guide will not get in the way, and the workability can be improved.

Variations

The configuration of the injection molding machine 10 described in the above embodiment can be modified as appropriate.

Variation 1

In the above embodiment, the positive X-side end 36A of the second rail 36 of the second guide part 32 folded with respect to the first guide part 30 is used as the stopper for stopping the movement of the safety door 18 to the negative X side. But other configurations may be considered.

$1^{st}$ Example

Figure 6:
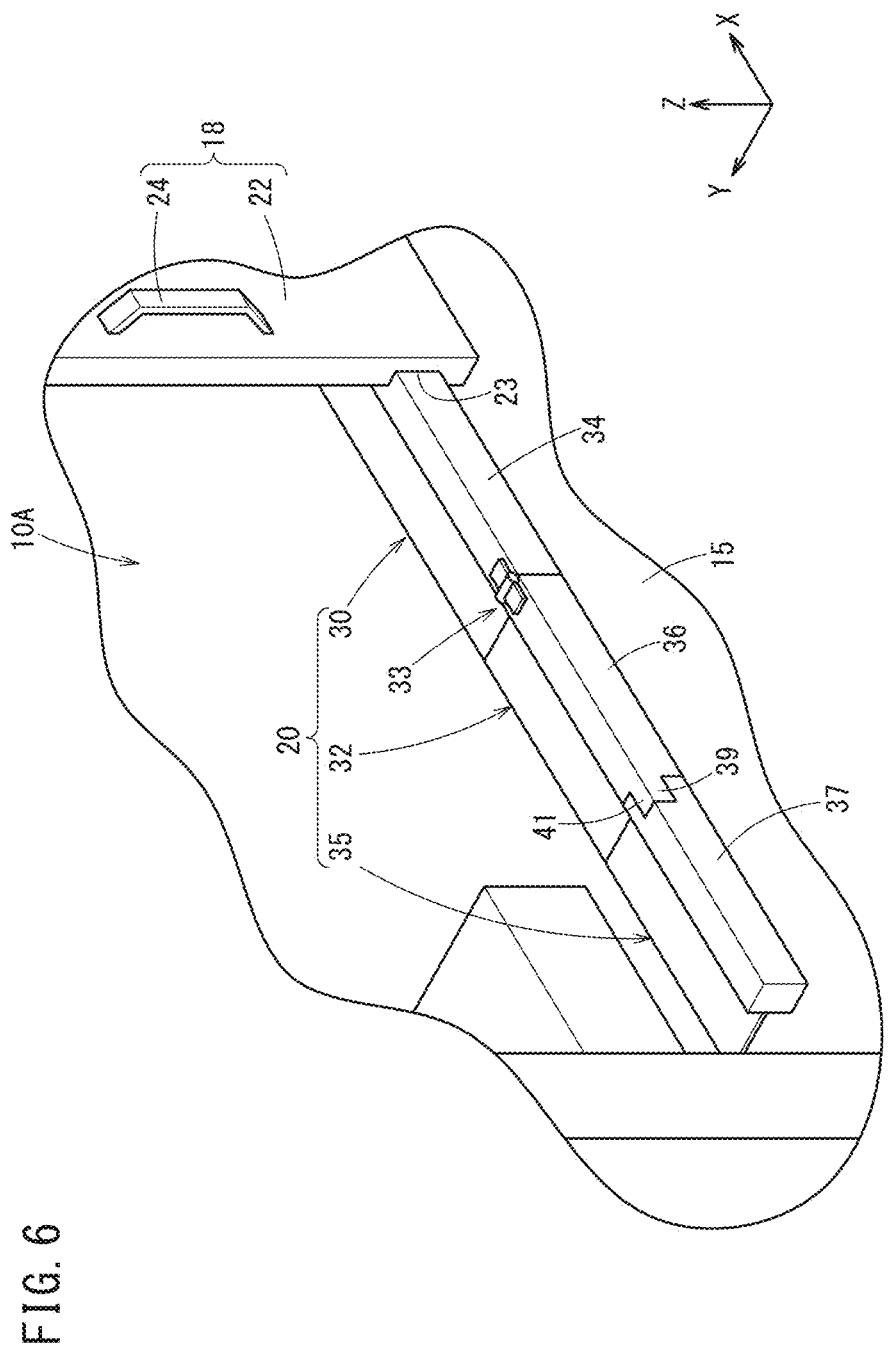
FIG. 6 is a view showing a state in which a safety door of an injection molding machine according to a $1^{st}$ example of a variation 1 is open with a second guide part set in place for guiding the door.
Figure 7:
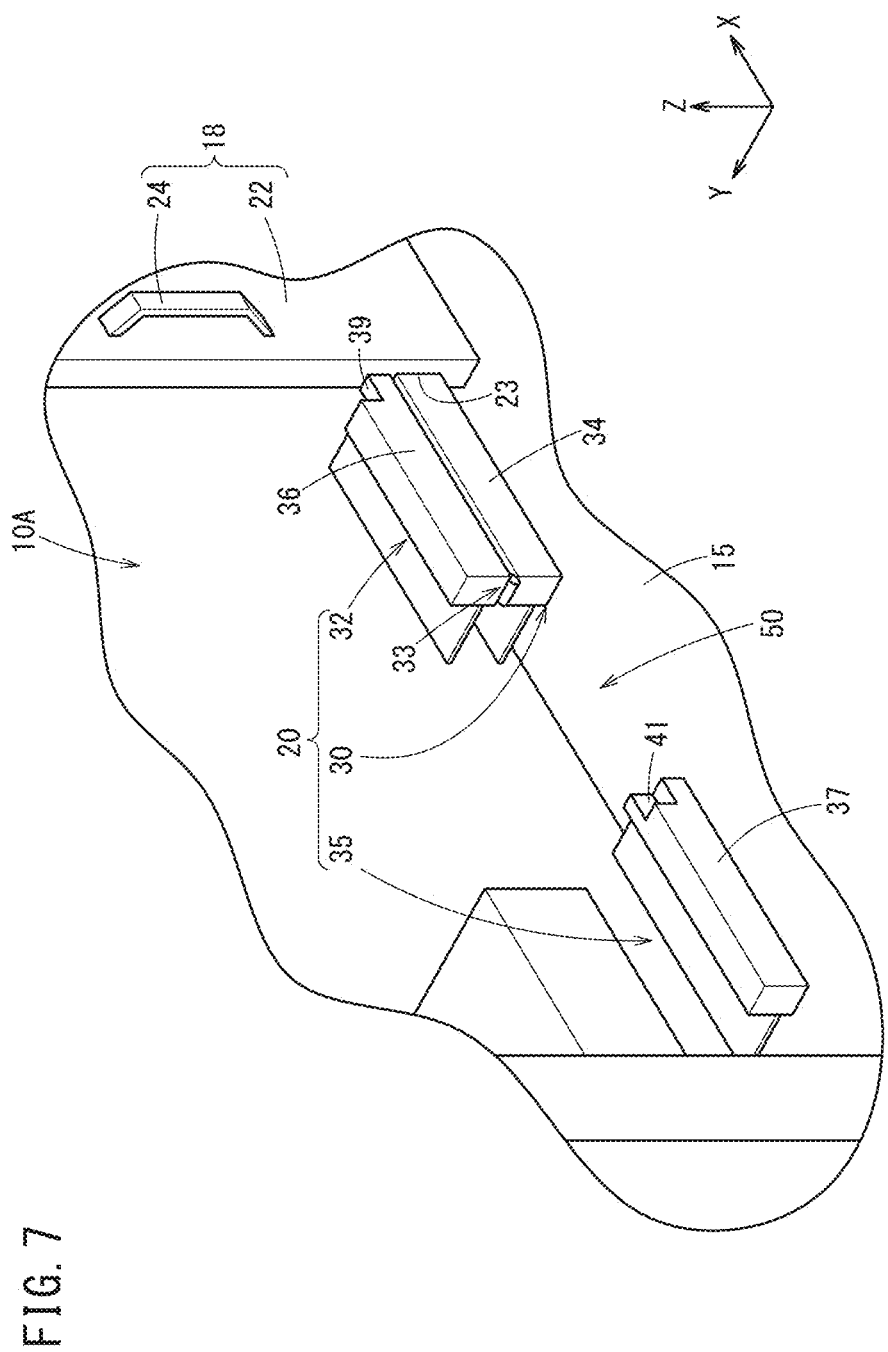
FIG. 7 is a view showing a state in which the safety door of the injection molding machine according to the $1^{st}$ example of the variation 1 is open with the second guide part folded up on a first guide part.

For example, in an injection molding machine 10A according to a $1^{st}$ example of the variation 1 shown in FIG. 6, a projecting piece 39 projecting in the negative X-direction is provided at the negative Y-side and positive Z-side corner on the negative X-side end face of the second rail 36 of the second guide part 32 located at the guiding position. A notch 41 to which the projecting piece 39 is fitted is formed on the negative Y-side and positive Z-side corner on the positive X-side end face of the third rail 37 of the third guide part 35. As a result, when the second guide part 32 is located at the guiding position, no step is formed between the second rail 36 and the third rail 37 so as to secure the function of a continuous guide rail. According to the $1^{st}$ example of the variation 1, when the second guide part 32 is folded up with respect to the first guide part 30, the projecting piece 39 opposes the negative X-side end face of the safety door 18 along the X-axis direction (see FIG. 7). At this time, the projecting piece 39 functions as a stopper for blocking the movement of the safety door 18 in the closing direction (negative X-direction).

$2^{nd}$ Example

Figure 8:
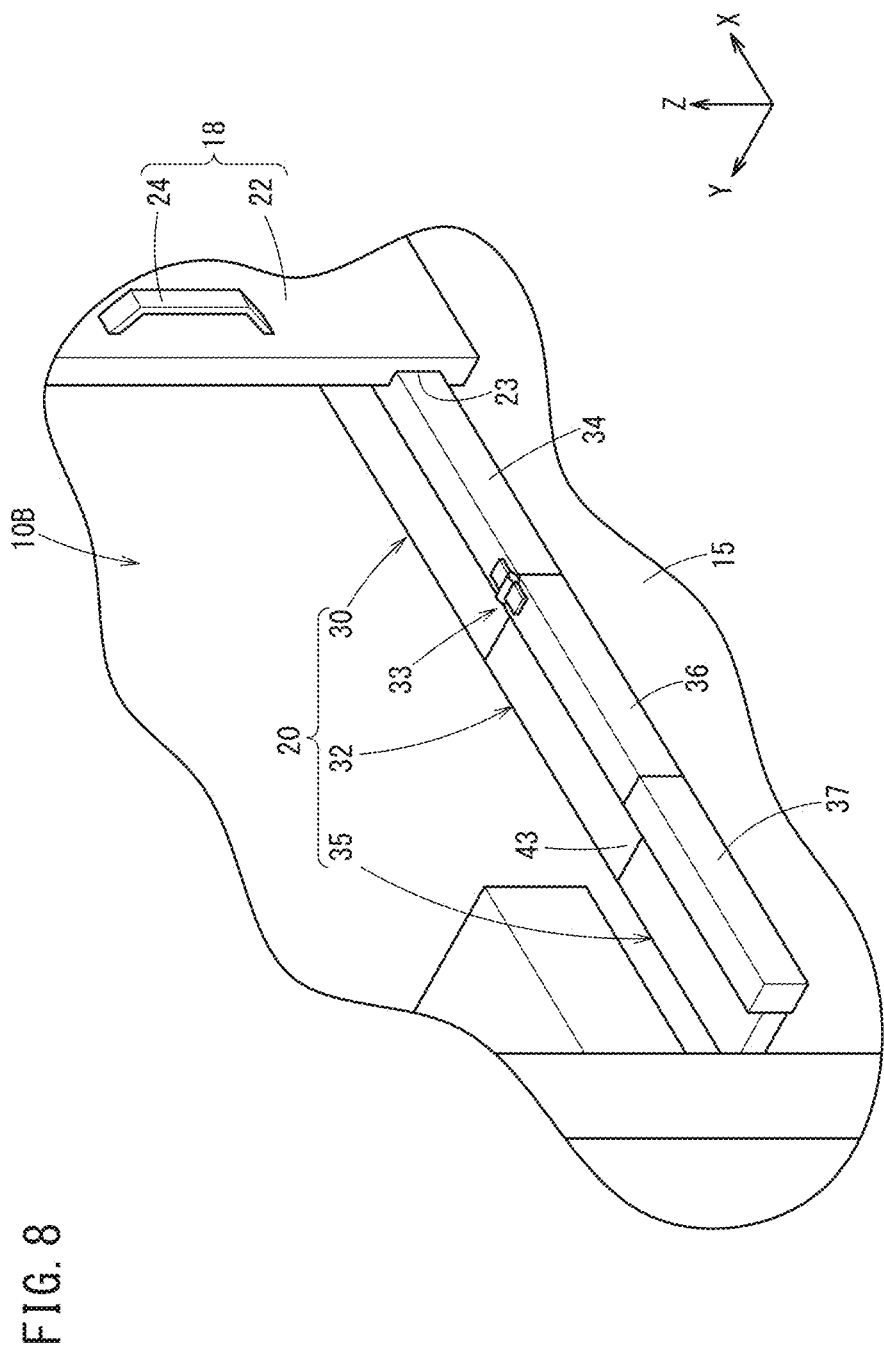
FIG. 8 is a view showing a state in which a safety door of an injection molding machine according to a $2^{nd}$ example of the variation 1 is open with a second guide part set in place for guiding the door.
Figure 9:
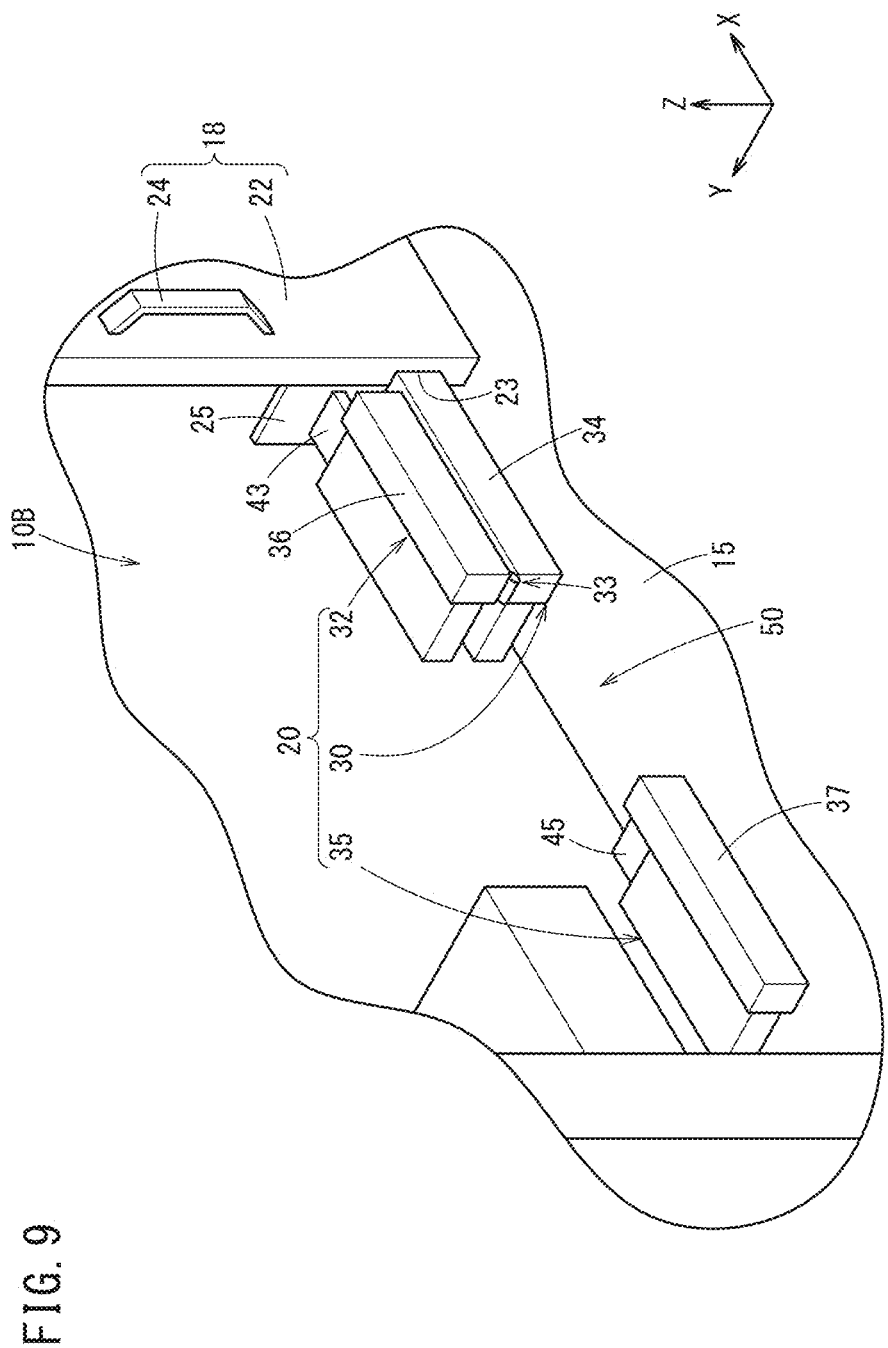
FIG. 9 is a view showing a state in which the safety door of the injection molding machine according to the $2^{nd}$ example of the variation 1 is open with the second guide part folded up on the first guide part.

For example, in the injection molding machine 10B according to a $2^{nd}$ example of the variation 1 shown in FIG. 8, a projecting piece 43 projecting in the negative X-direction is formed on the positive Z side portion of the negative X-side end face of the second guide part 32 that is located at the guiding position excluding the second rail 36. A notch 45 to which the projecting piece 43 is fitted is formed on the position Z side portion of the positive X-side end face of the third guide part 35 excluding the third rail 37 (see FIG. 9). A flat plate piece 25 is provided in the negative X-side and negative Z-side corner on the inner side (+Y side) surface of the door member 22 so as to be orthogonal to the X-axis direction (see FIG. 9). According to the $2^{nd}$ example of the variation 1, when the second guide part 32 is folded up with respect to the first guide part 30, the projecting piece 43 opposes the flat plate piece 25 along the X-axis direction (see FIG. 9). At this time, the projecting piece 43 functions as a stopper for blocking the movement of the safety door 18 in the closing direction (negative X-direction).

Variation 2

Figure 10:
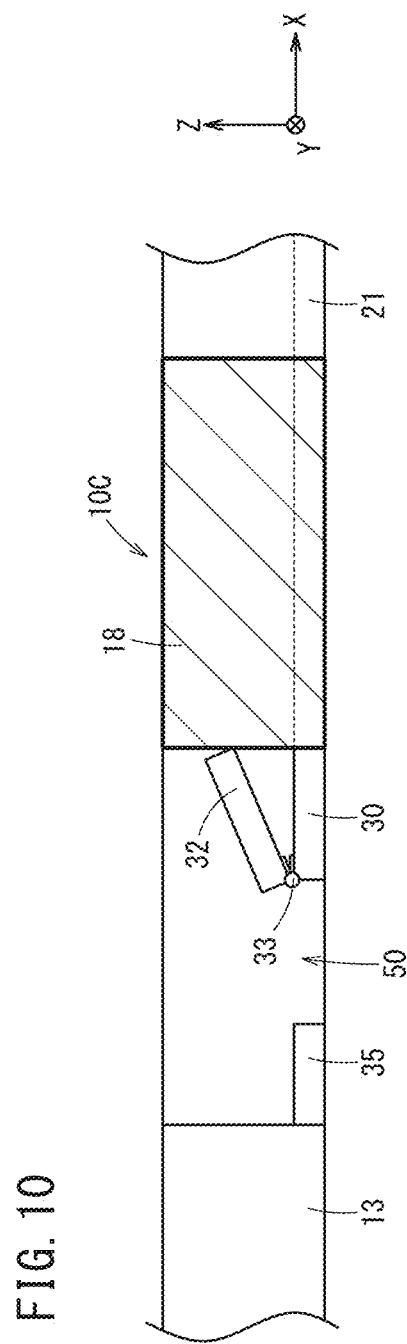
FIG. 10 is a view showing a state in which the movement of a safety door of an injection molding machine according to a variation 2 is stopped by a second guide part located over a first guide part.

In the above embodiment and the variation 1, the second guide part 32 is folded up with respect to the first guide part 30 to prevent the safety door 18 from moving in the closing direction (negative X-direction), but other configurations can be considered. For example, in an injection molding machine 10C according to a variation 2 shown in FIG. 10, the second guide part 32 moved over the first guide part 30 is positioned at a predetermined angle (at a predetermined position) greater than 0° with respect to the first guide part 30. At this time, the end of the second guide part 32 on the safety door 18 side may function as a stopper for blocking the movement of the safety door 18 in the closing direction (negative X-direction).

Variation 3

In the above-mentioned embodiment and each variation, although the $1^{st}$ guide part 30 and the 2nd guide part 32 are coupled by the hinge 33, other configurations may be considered.

$1^{st}$ Example

As an example, in an injection molding machine 10D according to a $1^{st}$ example of the variation 3 shown in FIG. 11A, the first guide part 30 and the second guide part 32 may be linked at their adjacent ends with a link mechanism (coupler) 44. The link mechanism 44 includes a linkage with one end pivotally connected to the negative X-side end of the first guide part 30 and the other end pivotally connected to the positive X-side end of the second guide part 32 located in the guiding position. In this case, the operator may lift and rotate the second guide part 32 located at the guiding position (see FIG. 11B) to place the second guide part 32 over the first guide part 30 (see FIG. 11C).

$2^{nd}$ Example

As example, in an injection molding machine 10E according to a $2^{nd}$ example of the variation 3 shown in FIG. 12A, the first guide part 30 and the second guide part 32 may be coupled by a link mechanism 46 connecting between the negative X-side end of the first guide part 30 and a middle portion of the second guide part 32. The link mechanism 46 includes a linkage with one end pivotally connected to the negative X-side end of the first guide part 30 and the other end pivotally connected to the middle portion of the X-axis direction of the second guide part 32 located in the guiding position. In this case, the operator may lift and move (see FIG. 12B) the second guide part 32 located at the guiding position toward the safety door 18 (the positive X side) so as to place the second guide part 32 over the first guide part 30 (see FIG. 12C). Here, instead of the link mechanism 46, the first guide part 30 and the second guide part 32 may be coupled by a link mechanism one end of which is pivotally connected to a middle portion of the X-axis direction of the first guide part 30 and the other end of which is pivotally connected to the positive X-side end of the second guide part 32 located in the guiding position.

Variation 4

The configurations of the safety door 18 and the guide 20 described in the above embodiment and the variations can be modified as appropriate. The point is that as long as the safety door 18 is slidably guided on the guide 20 in the X-axis direction, any configuration may be adopted. For example, a rail may be provided on the safety door 18 while a groove to which the rail is fitted may be formed in the guide 20.

Variation 5

The variations 1 to 4 may be arbitrarily combined as long as no technical inconsistency occurs.

The Invention that can be Grasped from the Embodiment and Variations 1 to 5

The present invention is an injection molding machine (10, 10A to 10E) which includes: a safety door (18); a guide (20) configured to slidably guide the safety door (18) in a direction of opening and closing a mold of the injection molding machine (10, 10A to 10E). The guide (20) includes: a first guide part (30) fixed to a machine base (15) of the injection molding machine (10, 10A to 10E); a second guide part (32) arranged on the safety door (18)'s closing direction side of the first guide part (30) and configured to be removable from the machine base (15); and a coupling (33, 44, 46) configured to connect the first guide part (30) and the second guide part (32) so that the second guide part (32) can be moved to a position over the first guide part (30).

As a result, when the second guide part (32) is moved to the upper side of the first guide part (30) with the safety door (18) residing at the opening side, the opening (50) is created in the guide (20), so that the operator can put his/her body through the opening (50) and operate the device (16) inside the injection molding machine (10, 10A to 10E). Due to this arrangement, the guide (20) does not interfere with the operator when the operator opens the safety door (18) to handle the device (16) inside the injection molding machine (10, 10A to 10E) and thus work performance is improved.

The second guide part (32) may have a stopper (36A, 39, 43) configured to block the movement of the safety door (18) in the closing direction when the safety door (18) is located on the opening side and when the second guide part (32) is moved to a predetermined position over the first guide part (30). As a result, it is possible to block the movement of the safety door (18) in the closing direction with a simple configuration (without using a stopper mechanism or any other complicated mechanism).

The predetermined position may be a position where the second guide part (32) is laid over the first guide part (30), and the stopper (36A, 39, 43) may be configured to block the movement of the safety door (18) in the closing direction when the second guide part (32) is located in the predetermined position. Thereby, the movement of the safety door (18) in the closing direction can be reliably prevented.

The stopper may be an end (36A) of the safety door's opening direction side of the second guide part (32) being located at the predetermined position. Thereby, the configuration of the coupling can be simplified without the need of providing a dedicated member that blocks the movement of the second guide part (32) in the closing direction.

The coupling may comprise a hinge (33). Thereby, the first guide part (30) and the second guide part (32) can be coupled with a simple configuration so that the second guide part (32) can be moved onto the first guide part (30).

The coupling may comprise a link mechanism (44, 46). Thereby, the first guide part (30) and the second guide part (32) can be coupled with a simple configuration so that the second guide part (32) can be moved onto the first guide part (30).

The present invention is not limited to the above-described embodiment, and various modifications can be made without departing from the gist of the present invention.

What is claimed is:

1. An injection molding machine, comprising:
   a safety door; and
   a guide configured to slidably guide the safety door in a direction of opening and closing a mold of the injection molding machine, wherein the guide includes:
      a first guide part fixed to a machine base of the injection molding machine;
      a second guide part provided for the machine base and configured to be removable from the machine base; and
      a coupling configured to connect the first guide part and the second guide part so that the second guide part can be moved to a position over the first guide part,
      wherein the second guide part is located on the machine base more toward a closing direction of the safety door than the first guide part is.

2. The injection molding machine according to claim 1, wherein the second guide part has a stopper configured to block a movement of the safety door in the closing direction when the safety door is located on an opening direction side and when the second guide part is moved to a predetermined position over the first guide part.

3. The injection molding machine according to claim 2, wherein:
   the predetermined position is the position where the second guide part is laid over the first guide part; and
   the stopper is configured to block the movement of the safety door in the closing direction when the second guide part is located at the predetermined position.

4. The injection molding machine according to claim 2, wherein the stopper is an end of the safety door's opening direction side of the second guide part being located at the predetermined position.

5. The injection molding machine according to claim 1, wherein the coupling comprises a hinge.

6. The injection molding machine according to claim 1, wherein the coupling comprises a link mechanism.

* * * * *